United States Patent
Drees et al.

(10) Patent No.: US 10,843,418 B2
(45) Date of Patent: Nov. 24, 2020

(54) PRESS FOR MAKING A PART FROM FIBER COMPOSITE

(71) Applicant: Siempelkamp Maschinen- und Anlagenbau GmbH, Krefeld (DE)

(72) Inventors: Reinhold Drees, Krefeld (DE); Michael Schoeler, Rheurdt (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 73 days.

(21) Appl. No.: 16/066,241

(22) PCT Filed: Jan. 10, 2017

(86) PCT No.: PCT/EP2017/050422
§ 371 (c)(1),
(2) Date: Jun. 26, 2018

(87) PCT Pub. No.: WO2017/129397
PCT Pub. Date: Aug. 3, 2017

(65) Prior Publication Data
US 2019/0030838 A1    Jan. 31, 2019

(30) Foreign Application Priority Data

Jan. 29, 2016 (DE) .......................... 10 2016 101 631

(51) Int. Cl.
*B29C 70/46* (2006.01)
*B30B 15/04* (2006.01)
(Continued)

(52) U.S. Cl.
CPC ............ *B29C 70/46* (2013.01); *B29C 70/446* (2013.01); *B30B 5/02* (2013.01); *B30B 15/047* (2013.01);
(Continued)

(58) Field of Classification Search
None
See application file for complete search history.

(56) References Cited

U.S. PATENT DOCUMENTS 3,362,322 A * 1/1968 Moehlenpah ........... B27F 7/155
100/231
3,756,145 A   9/1973 Amacker
(Continued)

OTHER PUBLICATIONS

English translation of JP 2002346797 (Year: 2002).*

*Primary Examiner* — Jacob T Minskey
*Assistant Examiner* — Baileigh Kate Darnell
(74) *Attorney, Agent, or Firm* — Andrew Wilford

(57) ABSTRACT

The invention relates to a press for producing a component from a fibre-composite material, which is designed as a membrane press, comprising a press frame (15), a press lower part (3) on which a mould (4) is arranged, a press upper part (5) having a pressure chamber (6) that can be sealed against the press lower part (3), one or more press cylinders (9) which are supported on the press frame and act on the press upper part (5) and/or the press lower part (3), a membrane (11) that can be tensioned over the mould (4), a vacuum pump (12) with which a vacuum can be generated on a side of the membrane (11), for example on the underside, characterised in that the press frame is designed as a C-frame with an upper horizontal C-arm, a lower horizontal C-frame and a vertical C-base.

9 Claims, 4 Drawing Sheets

(51) Int. Cl.
*B30B 5/02* (2006.01)
*B29C 70/44* (2006.01)
*B29K 101/12* (2006.01)

(52) U.S. Cl.
CPC ........ *B30B 15/048* (2013.01); *B29K 2101/12* (2013.01)

(56) References Cited

U.S. PATENT DOCUMENTS

| | | | |
|---|---|---|---|
| 4,078,962 A * | 3/1978 | Krueger | B30B 5/02 100/211 |
| 5,145,621 A | 9/1992 | Pratt | |
| 5,225,027 A | 7/1993 | Diekwisch | |
| 5,580,415 A * | 12/1996 | Diekwisch | B23Q 1/03 100/211 |
| 5,664,494 A * | 9/1997 | Hoeh | B30B 15/047 100/214 |
| 5,820,724 A | 10/1998 | Diekwisch | |
| 6,892,560 B2 | 5/2005 | Hiramatsu | |
| 2003/0232176 A1* | 12/2003 | Polk, Jr. | B29C 31/047 428/167 |
| 2004/0219244 A1 | 11/2004 | Filsinger | |
| 2010/0181017 A1 | 7/2010 | Shinoda | |

* cited by examiner

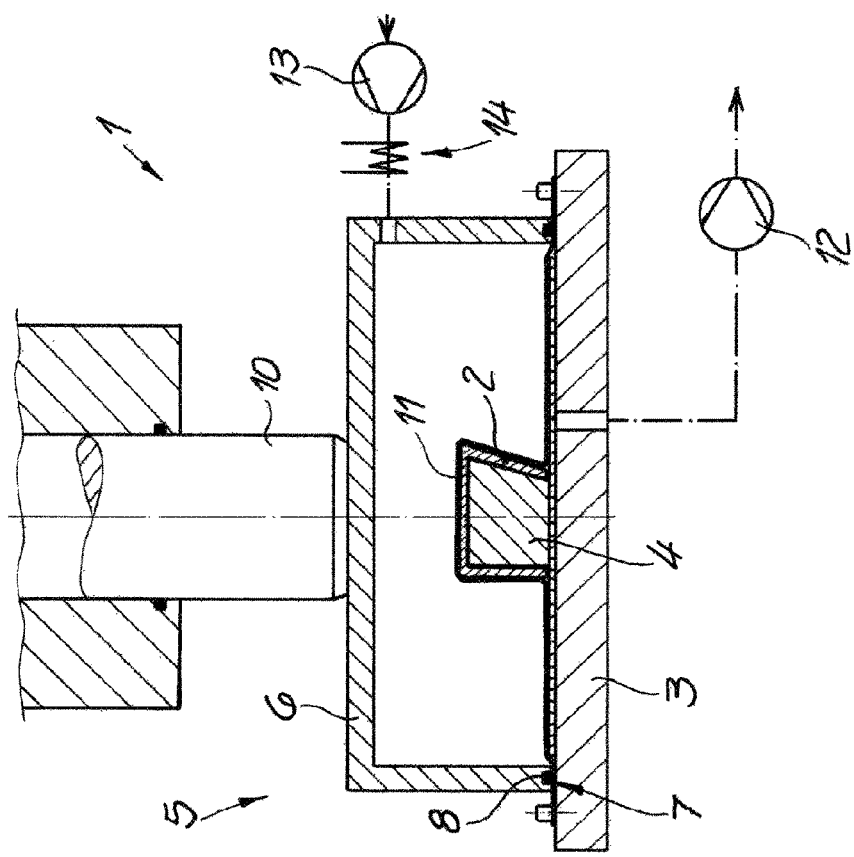
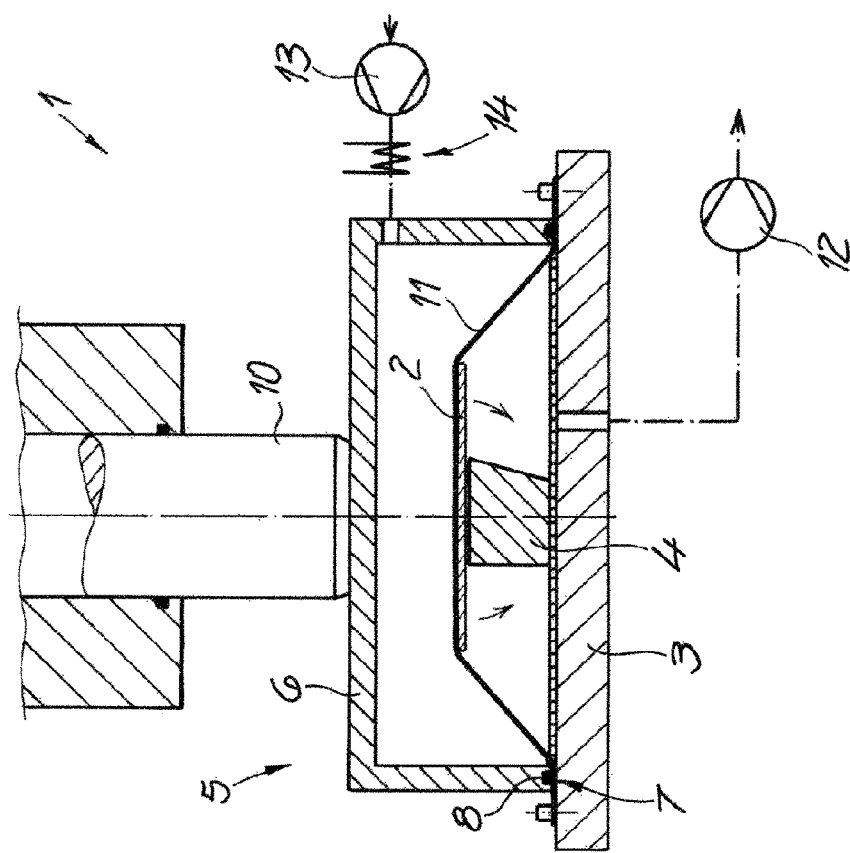

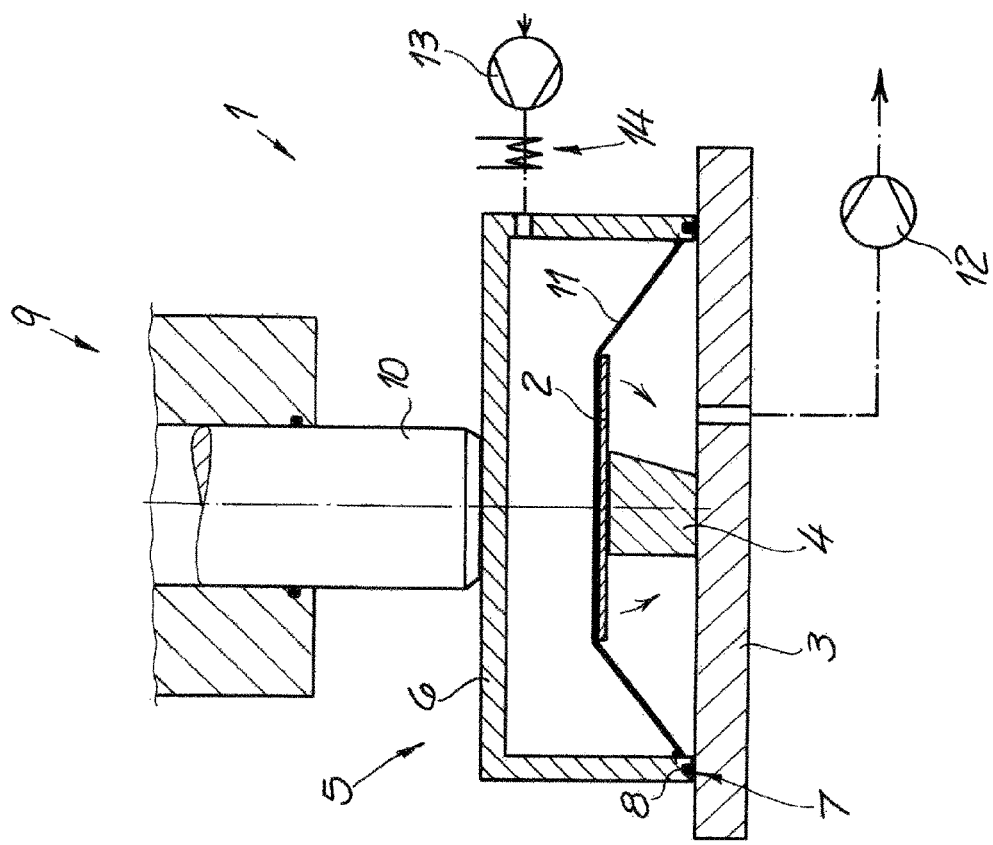
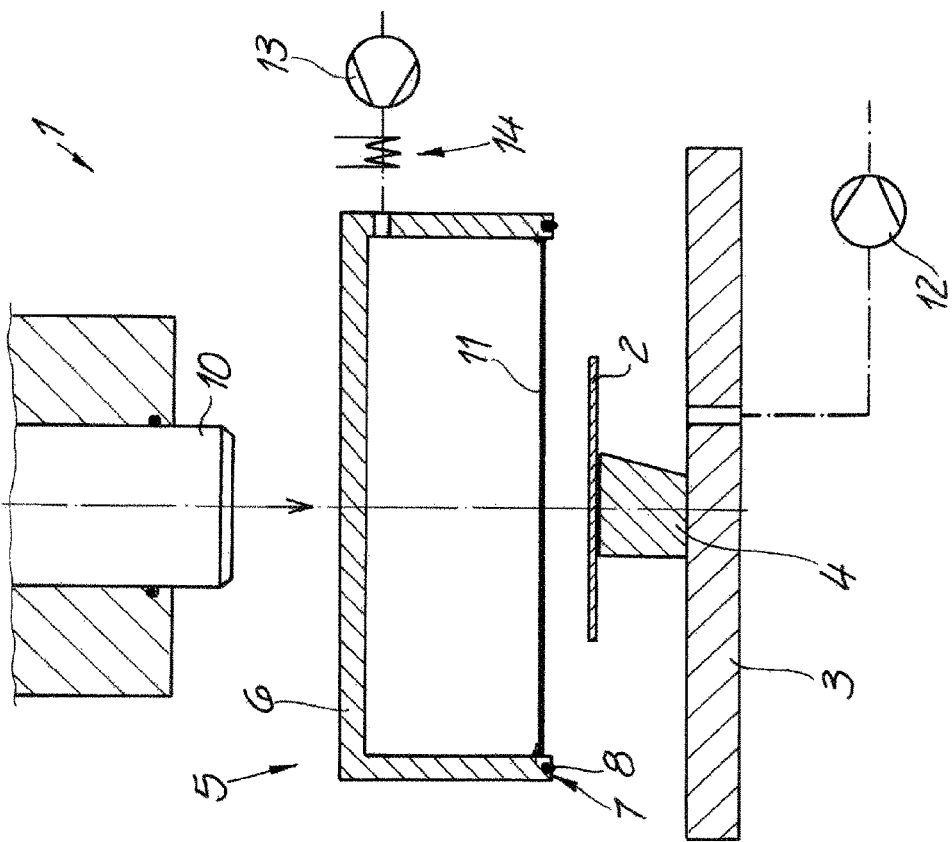

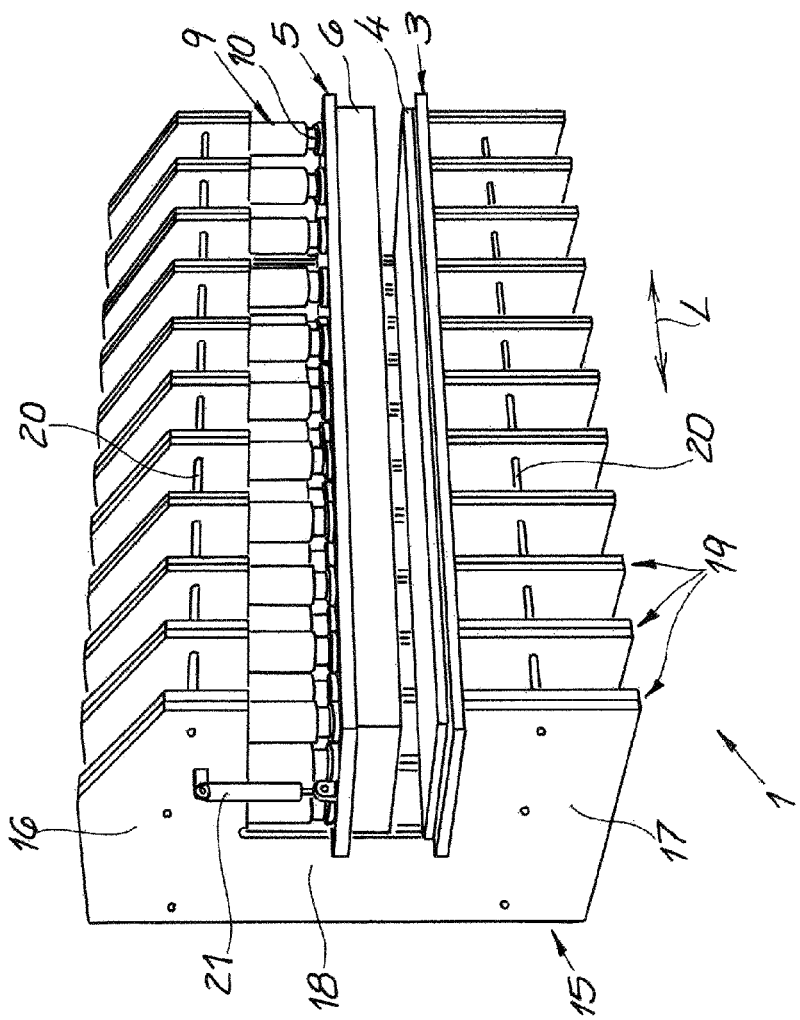
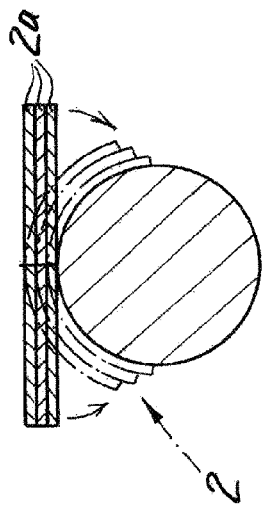
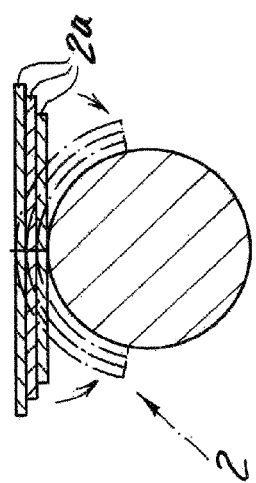

PRESS FOR MAKING A PART FROM FIBER COMPOSITE

CROSS REFERENCE TO RELATED APPLICATIONS

This application is the US-national stage of PCT application PCT/EP2017/050422 filed 10 Jan. 2017 and claiming the priority of German patent application 102016101631.4 itself filed 29 Jan. 2016.

FIELD OF THE INVENTION

The invention relates to a press for making a (three-dimensional) part from fiber composite by deformation of a (two-dimensional) thermoplastic semifinished product, for example organic sheet.

BACKGROUND OF THE INVENTION

In the context of the invention, an "organic sheet" is a plate-shaped (consolidated) semifinished product consisting of fibers embedded in a matrix of thermoplastic plastic. The fibers can be continuous or long, for example in the form of a fiber weave or fiber nonwoven. The fibers can be for example of carbon, glass, or aramid. Such organic sheets are used as fiber composites for making parts (for example lightweight design) for aerospace engineering (for example aircraft construction) and for automotive engineering (for example in automobile construction). The use of the thermoplastic fiber matrix allows one to (thermo)shape such organic sheets similarly to metal sheets, so that, in practice, methods for working metal sheets are used during the processing of organic sheets and during the manufacture of parts from such organic sheets.

For instance, DE 10 2011 115 730 describes a method of shaping thermoplastic semifinished fiber plates with oriented fibers into three-dimensionally shaped thermoplastic semifinished products with defined degrees of orientation, with the semifinished fiber plate that is formed from an organic sheet being heated by a heater to a temperature below a softening temperature of the thermoplastic resin, and with the semifinished fiber plate being positioned on a molding module of the desired three-dimensional shape. A fluid is then fed into the molding chamber so that the heated semifinished fiber plate is pressed against the molding module and is thus deformed into the three-dimensionally shaped thermoplastic semifinished product.

Other methods for processing organic sheets and/or parts made from such organic sheets are described for example in DE 10 2013 105 080, DE 10 2011 111 233, and DE 10 2011 111 232.

Alternatively, DE 198 59 798 describes the manufacture of molded bodies from fiber composites by the so-called prepreg method. Thin layers of fibers embedded in partially cured resin are laminated together until a preform of the molded body has been created. This preform is subsequently cured under mechanical pressure with the simultaneous application of a vacuum to draw air bubbles out of the preform by heating. This is typically performed in an autoclave holding the preform on a negative mold and is covered by a flexible membrane. The flexible membrane is sealed off against the negative mold. A layer of woven material is also placed between the preform and the membrane that serves to absorb excess resin and to form a vacuum zone, the so-called vacuum bag. The interior of the vacuum bag is connected to a vacuum source.

Taking this as a point of departure, DE 198 59 798 describes the manufacture of molded bodies from fiber composites that builds upon an RTM method. A fiber mat is placed on a rigid negative mold, and the fiber mat is covered with a flexible membrane. The membrane is sealed around the fiber mat relative to the negative mold, and the space between the negative mold and the membrane that is formed in this way is evacuated, and a static superatmospheric pressure is applied to the rear face of the membrane turned away from the negative mold. A quantity of liquid resin is then injected into the space between the negative mold and the membrane at an injection pressure that is greater than the superatmospheric pressure on the rear face of the membrane. The resin is heated on the rear face of the membrane by the heated negative mold under the effect of the superatmospheric pressure and cured at least partially. The superatmospheric pressure on the rear face of the membrane is then reduced, and the molded body with the fiber mat embedded into the at least partially cured resin is demolded. The negative mold can be continuously heated, and the membrane can be cooled on its rear face.

Similar methods of using a membrane press and a resin is injected into the mold space are described for example in EP 1 420 940 [US 2004/0219244] or DE 694 09 618.

DE 40 40 746 [U.S. Pat. No. 5,145,621] describes a method of compressing, in a membrane press, a composite material body with a structure of fibers embedded in a matrix that reinforce uncompressed layers.

OBJECT OF THE INVENTION

It is the object of the invention to provide a press for making (lightweight) parts made of fiber composite that is characterized by simple and stable construction and is preferably suited for the production of large parts.

SUMMARY OF THE INVENTION

To attain this object, the invention teaches a press for making a part from fiber composite that is formed as a membrane press with a press frame, a press lower element against/on which a mold is provided, a press upper element having a pressure case that can be sealed against the press lower element, one or more press cylinders supported on the press frame and act on the press upper element and/or on the press lower element, a membrane stretchable over the mold, and a vacuum pump that can generate a subatmospheric pressure on one side of the membrane, for example on the underside.

According to the invention, this press is characterized in that the press frame is C-shaped and has an upper horizontal C-leg, a lower horizontal C-leg, and a vertical C-base that interconnects in the upper C-leg and in the lower C-leg.

Such a membrane press with a C-shaped frame is particularly suited for the production of large parts and in particular for the production of flat or shaped parts, for example aircraft wings, flaps of aircraft wings, etc. The C-press is characterized by a laterally open design, so that large or long semifinished products in particular can be easily inserted into the press and shaped.

Preferably, a C-shaped frame with a multiframe construction is used. Multiframe construction means that the C-shaped frame consists of a plurality of identical C-frames interconnected and provided one behind the other in the longitudinal direction. The individual C-frames can be clamped together with clamping elements, for example tension rods. Such C-frames preferably each consist of one or more frame plates, with each of the frame plates being preferably formed as a single piece. One embodiment of the C-shaped frame having a multiframe construction is characterized by a simple and stable modular design, since the press frame is composed of a plurality of identical or similar parts built one behind the other, thus enabling presses of great length or width for the production of large parts to be produced with great ease.

In a preferred embodiment, the press is formed as a downstroke press. This means that the press cylinders are supported on the upper C-leg and act upon the movable press upper element that thus is formed by a throughgoing beam. The pressure case is then preferably secured to this throughgoing beam. The press lower element forms the press table and is thus fixedly mounted on the lower C-leg and supported thereon.

In principle, however, presses can also have an upstroke design.

The press has a vacuum pump that can create a subatmospheric pressure at one side of the membrane, for example on the underside. Optionally, a superatmospheric pressure pump (additionally) can form a superatmospheric pressure on the other side of the membrane.

The press lower element, for example the press table, is preferably heatable. A heater is therefore connected to the press lower element or the press lower element is formed with an integrated heater.

In another embodiment, it is possible for the press upper element to be heatable. This can be a heatable throughgoing beam. The pressure case can be secured to this throughgoing beam. This pressure case can also be independently heatable. It is also possible to heat the pressure case via the heatable throughgoing beam.

The die or the mold itself can also be heatable. The mold can be formed from a heatable base plate. Optionally, however, a heatable base plate can also be on the press table, on which a (separate) die or a separate mold is then mounted.

The membrane is preferably formed as a silicone membrane or silicone film.

Preferably, the membrane is secured to the press upper element and especially preferably to the pressure case, for example so as to be elastically clamped or elastically biased in the pressure case. In principle, however, it also lies within the scope of the invention for the membrane to be secured to the press lower element and stretched over the mold.

With such a press, parts can be made of fiber composite by placing at least one semifinished product, for example an organic sheet, as a workpiece against or on the mold, wherein
  an elastically flexible membrane is flexibly stretched over the mold with interposition of the semifinished product/organic sheet, and
  the semifinished product/organic sheet is deformed so as to form the part by application of a subatmospheric pressure to the membrane on the side turned toward the mold and optionally by application of a superatmospheric pressure to the side turned away from the mold, so that the semifinished product/organic sheet is shaped against the mold.

The invention proceeds in this regard from the discovery that high-stability and high-precision three-dimensional fiber composite parts can be manufactured economically from organic sheets, for example, in a membrane press, with such organic sheets being available as (two-dimensional) plate-shaped consolidated semifinished products and outstandingly suitable for deforming into three-dimensional structures by application of pressure and heat to form structures useable in aircraft construction, automobile construction, or the like. Unlike in conventional prepreg methods, however, it is preferred not to use mats that are only partially cured, but rather consolidated semifinished products in the form of organic sheets, so that no injection of liquid resins or the like into the press occurs. Especially preferably, an organic sheet is used as a prefabricated semifinished product that is composed of a plurality of organic sheet layers placed together and optionally joined together before introduction into the press. Highly stable parts can be produced in this way that can also have a significant thickness or wall thickness. Nonetheless, flawless shaping is achieved in the membrane press in the context of the invention, since a (highly) elastically flexible membrane is clamped into the press that is elastically stretched and clamped over the mold with interposition of the organic sheet. The application of subatmospheric pressure on the one hand and superatmospheric pressure on the other hand ensures flawless shaping with the highly elastic membrane stretching strongly and perfectly against the desired contour and, with interposition of the organic sheet, against the contour of the mold. By the application of subatmospheric pressure on the one hand and (very high) superatmospheric pressure on the other hand, it is possible to shape consolidated organic sheets into parts having a complex structure and small radii, so that even U-shaped profiles with and without undercut can be manufactured flawlessly, for example. The high pressures in the membrane press ensure perfect venting of the workpiece, so that the formation of pores is prevented and/or pores can be removed. Overall, the manufactured parts are characterized by very high surface quality and a high level of stability. However, the invention also includes the shaping of other thermoplastic semifinished products. For instance, several (non-consolidated) individual thermoplastic layers (made of fiber composite) can also be inserted in the press and processed as a semifinished product.

Overall, it is possible to produce highly stable, lightweight parts for aircraft construction, for bearing surfaces or bearing surface parts, for example. For example, profiles can be produced that can be used as a part of landing flaps.

Semifinished products or organic sheets are preferably used whose fibers are of carbon, glass, and/or aramid. Thermoplastic plastics are especially preferably used that are stable at high temperatures, such as polyether ether ketone (PEEK) or polyphenylene sulfide (PPS). Alternatively, however, polypropylene (PP), polyamide (PA), or polyurethane (TPU) can also be used, depending on the requirements and area of application. The materials used can be used in (consolidated) organic sheets or (consolidated) organic sheet layers or, alternatively, also in (non-consolidated) semifinished fiber products or layers thereof.

During manufacturing, it is advantageous for the semifinished product/organic sheet to be heated before and/or after placement into the press in order to optimize the shaping process. It is advantageous for the semifinished product/organic sheet to be heated to a temperature above the glass transition temperature. Depending on the material or organic sheet, and depending on the thermoplastic plastic, it can be advantageous to heat the organic sheet to a temperature of greater than 180° C., for example greater than 200° C.

Alternatively or in addition, it is advantageous to heat the mold or at least the surface turned toward the organic sheet before and/or during shaping. Here, too, it can also be advantageous to heat the mold, more particularly its surface, to a temperature above the glass transition temperature of the thermoplastic, for example to a temperature of greater than 180° C., for example greater than 200° C.

Moreover, it is alternatively or additionally advantageous if the fluid medium that applies pressure to the membrane, such as for example a pressurized gas is heated in order to optimize the heat input and improve hot shaping.

Preferably, not only is a subatmospheric pressure applied to the side of the membrane turned toward the mold, but rather a superatmospheric pressure is also applied to the side of the membrane turned away from it, with it being especially preferably possible for a superatmospheric pressure of at least 10 bar, for example at least 20 bar to be produced. According to the invention, high pressures are thus used in order to take into account the fact that consolidated organic sheets, for example, are being processed or shaped.

A vacuum bag is preferably not used for this purpose, as is common with membrane presses when processing prepregs or for the injection of resin, but rather the highly elastic membrane is stretched over the mold. For example, it can be secured to the lower element of the press and stretched over the mold. Preferably, however, the membrane is also secured to the lower element of the press in an elastically biased manner and then stretched over the mold as the press is closed.

In principle, membranes made of rubber can be used. In consideration of the fact that plastics are preferably used that are stable at high temperatures, the invention recommends the use of a membrane that is made of a highly elastic yet thermally stable material such as silicone or a silicone-based material. Existing silicone membranes can be used that have an elongation at rupture of at least 500%, preferably at least 600%. The membrane preferably has a thickness of at least 1 mm, especially preferably at least 2 mm.

As described above, a prefabricated semifinished product composed of a plurality of organic sheet layers or a large number of organic sheet layers that are placed together before placement into the press and optionally joined together is especially preferably used. It lies within the scope of the invention, however, for the organic sheet layers to be placed together individually and pressed collectively. Preferably, however, the organic sheet layers are previously joined together (in a desired arrangement), for example by welding and/or gluing, in which case an intimate bond is created subsequently during shaping in the membrane press. Alternatively, it lies within the scope of the invention for the individual organic sheet layers to be combined into a unitary organic sheet in a prepress.

In that case, a large number of layers can be used, for example, five layers, preferably at least ten layers. For highly stable parts (for aircraft construction, for example), more than twenty layers can also be joined together to form one organic sheet. Moreover, a plurality of (non-consolidated) layers can be preferably inserted (loosely) into the press, for example at least five layers, preferably at least ten layers. The processing of individual layers provides the advantage that they can slide freely against one another during shaping, so that, in particular, even complicated structures that potentially have several undercuts can be produced flawlessly.

It lies within the scope of the invention for individual layers having different fiber orientations to be used and/or for the individual layers to be stacked such that their fibers do not run parallel, but rather at a predefined angle. Especially stable organic sheets and corresponding parts can be produced in this way, The characteristics and geometry of the part can be influenced outstandingly by the selection and arrangement of the individual layers. For example, the possibility exists of providing individual layers in different sizes to form a semifinished product, for example an organic sheet, whose thickness varies over its surface. In areas in which more layers are present, for example, workpieces with a greater thickness or wall thickness are created than in other areas. Similarly, it is possible to position the individual layers such that a desired edge geometry of the part is created during deformation by offsetting of the individual layers in relation to one another. For example, if the individual layers are flush in the non-deformed state, a sloped edge geometry can be produced by the deformation and, conversely, a square edge shape can be achieved by a skew arrangement of the individual layers in the edge region as a result of deformation. It may be desirable, for example, to produce parts with beveled edges in order to make better joining surfaces available for further processing.

In another preferred development, an at least partially air-permeable mold can be used through which air is sucked during the generation of the negative pressure. This can be achieved, for example, by the use of a mold that is made of a porous material. Preferably, a mold made of a porous light metal, especially preferably of porous aluminum or a porous aluminum alloy, is used. The invention assumes in this regard that the manufacturing process can be optimized by the use of such a mold, since this creates the opportunity to apply a full-surface vacuum over the entire surface to be shaped. The porous material is preferably an open-pore porous material, for, for example open-pore porous aluminum or an open-pore porous aluminum alloy. A material is preferably used that has a filter mesh of from 5 μm to 250 μm, for example 30 μm to 120 μm, and/or a pore size of from 0.1 mm to 3 mm, for example 0.2 mm to 1.5 mm.

Pore size refers here to the (maximum) diameter of the pores. Filter mesh refers here to the (minimum) width of the (passage) openings between the pores of the open-pore structure.

BRIEF DESCRIPTION OF THE INVENTION

The invention is described in further detail below with reference to a schematic drawing that illustrates only one embodiment. In the figures:

FIG. 1 is a simplified view of a membrane press according to the invention,

FIG. 2 shows the press of FIG. 1 in another functional position,

FIG. 3 shows a modified embodiment of the press according to FIG. 1,

FIG. 4 shows the press pf FIG. 3 in another functional position,

FIG. 5 shows a first embodiment of a process for shaping a multilayer organic sheet, FIG. 6 shows a second embodiment of a process for shaping a multilayer organic sheet, FIG. 7 is a perspective view of a press according to the invention with C-frame.

SPECIFIC DESCRIPTION OF THE INVENTION

Figure 9:
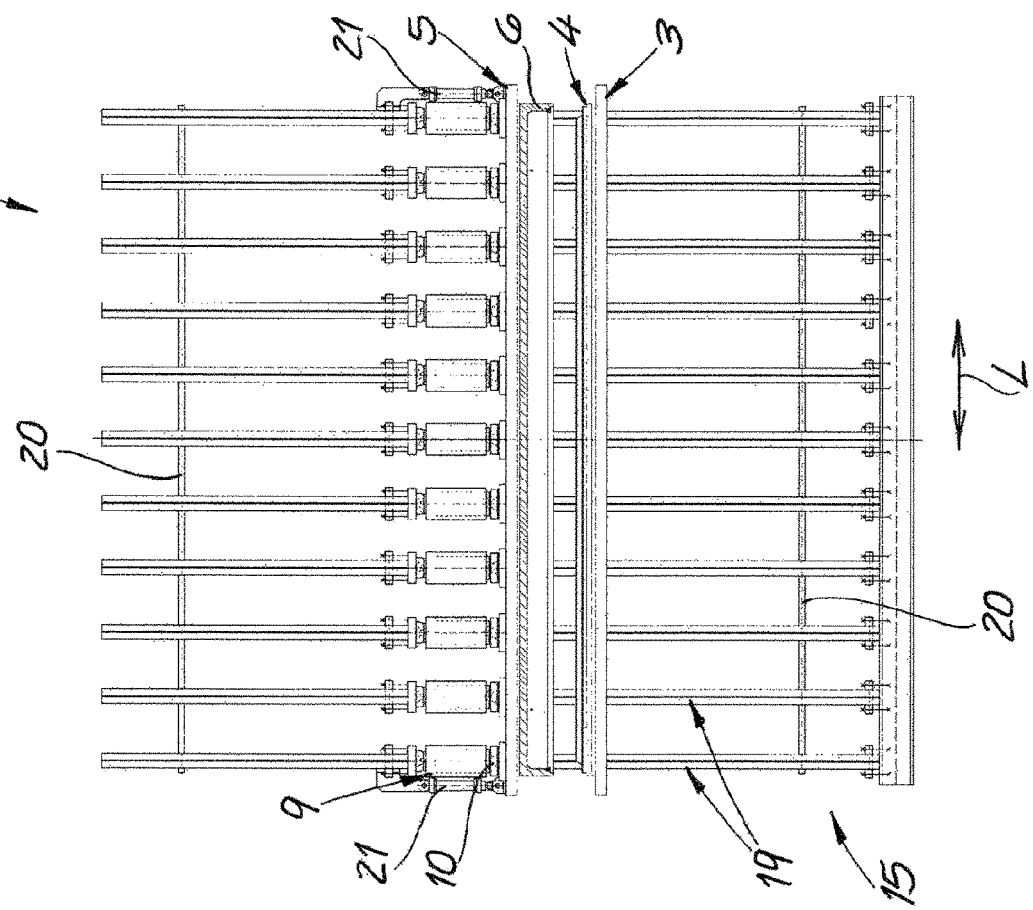
FIG. 9 is a side view of the press according to FIG. 7.

The figures show a membrane press 1 for making a part from fiber composite. In such a membrane press, a part is manufactured from fiber composite by shaping a thermoplastic semifinished product, for example an organic sheet 2.

Here, the membrane press 1 has a lower element 3 formed as a press table supporting a mold 4 that is a negative of the part to be manufactured. Moreover, the press 1 has an upper element 5 that has a hood-like pressure case 6 that can be sealed against the lower element 3. For this purpose, the lower, annular front edge 7 of the pressure case 6 that can be placed on the press table is provided with a circumferential seal 8. A press cylinder 9 acts on the upper element 5; here, the piston 10 of the press cylinder 9 is connected to the pressure case 6 so that the pressure case 6 is pressed by the cylinder 9, more particularly the piston 10 thereof, against the lower element 3. Moreover, the membrane press 1 is equipped with an elastic membrane 11 that can be stretched over the mold 4. Furthermore, a vacuum pump 12 is provided that here is connected to the lower element 3. Moreover, a superatmospheric pressure pump 13 can be optionally provided that here is connected to the upper element 5 and/or to the pressure case 6.

To shape an organic sheet 2, it is placed on the mold 4, and the membrane 11 is flexed and stretched over the mold 4 on top of the organic sheet 2.

The organic sheet is deformed so as to deform the part by applying a subatmospheric pressure by the vacuum pump 12 to the face of the membrane 11 facing the mold 4 and by applying a superatmospheric pressure by the superatmospheric pressure pump 13 to the face turned away from the mold 4, so that the organic sheet 2 is shaped against the mold to form the part.

The organic sheet 2 is heated before being placed into the press 1. Moreover, the mold 4 or at least its surface facing the organic sheet 2 is heated before and/or during the deformation. Finally, it is advantageous if the fluid medium that applies superatmospheric pressure to the membrane is heated. To achieve this, a heater 14 is shown schematically in the figures. Heaters for heating the organic sheet and for heating the mold are not shown.

FIG. 1 shows a first embodiment of such a membrane press in which the membrane 11 is secured to the lower element 3 and stretched over the mold 4. FIG. 1 shows the press after the organic sheet 2 has been placed onto the mold 4 and the membrane 11 has been stretched over the mold 4 with interposition of the organic sheet 2. Moreover, after placement of the organic sheet 2 and after the stretching of the membrane 11 on the lower element 3, the upper element 5 is lowered and sealed off. The subatmospheric pressure can be generated using the vacuum pump 12 before and/or after lowering of the upper element. After the upper element 5 has been lowered and sealed against the lower element 3, the superatmospheric pressure is applied to the interior of the pressure case 6. The compressive force that holds the membrane press closed as the internal pressure increases is increased successively with rising of the internal pressure and thus adapted thereto. FIG. 2 shows the press after superatmospheric pressure and subatmospheric pressure have built up, with the deformed organic sheet 2.

FIGS. 3 and 4 show a modified embodiment of such a membrane press in which the membrane is not secured to the lower element 3, but rather to the upper element 5, namely to the pressure case 6 thereof, and elastically biased. After placement of the organic sheet 2 onto the mold 4, the pressure case 6 is lowered and, at the same time, the membrane is stretched over the mold with interposition of the organic sheet 2 (FIG. 4). After the press has been closed, the subatmospheric pressure and the superatmospheric pressure are built up so that the organic sheet 2 is deformed and the part made.

The organic sheet 2 can be composed as shown in FIGS. 5 and 6 of a plurality of individual organic sheet layers 2a that are placed together to form the organic sheet 2 and deformed in the press. The geometry of the layers 2a can be coordinated with one another such that the individual layers 2a are offset relative to one another during deformation, thereby altering the edge geometry of the part. This option is illustrated in FIGS. 5 and 6.

According to FIG. 5, the individual layers 2a are placed together to form an organic sheet 2 with square edges. During deformation, the individual layers are offset relative to one another, so that a part with beveled edges is made.

By contrast, FIG. 6 shows an embodiment in which the individual layers 2a of the organic sheet 2 are not flush with one another, but rather form an angled edge so that a part with a square edge without a bevel is then created during deformation.

The invention will be explained particularly with reference to FIGS. 7 to 9. These figures show that the press frame 15 is C-shaped and has a row of C-shaped press frames 19 each having an upper C-leg 16, a lower C-leg 17, and a vertical C-base 18 that connects the horizontal legs 16, 17 to one another. Each C-frame 19 consists of one or more (one-piece) frame plates. The individual C-frames 19 are clamped together by clamping elements, such as tension rods 20, so as to be one behind the other in the longitudinal direction L.

Figure 8:
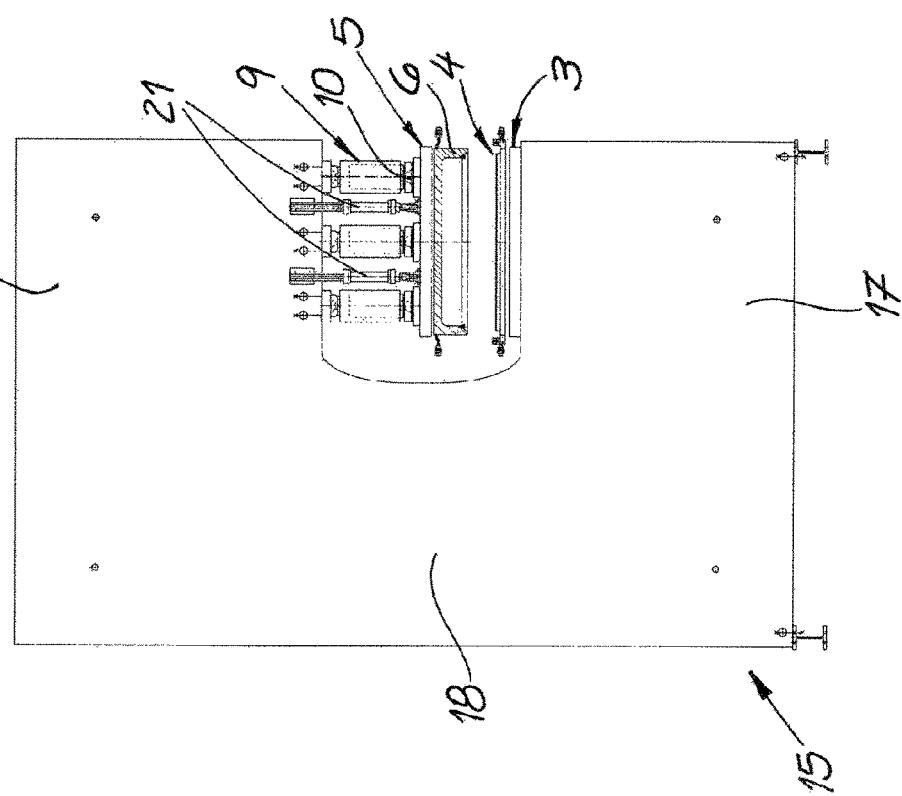
FIG. 8 is a front view of the press according to FIG. 7.

FIGS. 7 to 9 show an embodiment of such a membrane press as a downstroke press. The press upper element 5 is thus designed as a throughgoing beam to which the pressure case 6 is secured. The press lower element 3 is formed as a press table, with this press table 3 spanning over the lower C-legs 16 and/or the C-frame thereof. A plurality of press cylinders 9 are provided that are secured to and supported on the upper C-legs 16 and operate on the movable throughgoing beam 5 by virtue of the fact that the pistons 10 of the press cylinder 9 are connected to the press upper element 5 and thus for example to the throughgoing beam.

In the illustrated embodiment, the press cylinders 9 are in a matrix or in a grid composed of several rows, with three rows (See FIG. 8) provided in this embodiment, and each row extends over the entire length of the press. A plurality of press cylinders 9, for example three press cylinders, are associated with each C-frame 19. Moreover, it can be seen in FIGS. 7-9 that, in addition to the press cylinders 9, retraction cylinders 21 can also be provided.

The press cylinders 9 can thus be formed in principle as single-acting cylinders that apply the pressing forces. The press cylinders 9 can then be retracted by the retraction cylinders 21 and the press thus opened. Optionally, however, the pressing cylinder 9 can also be formed as a double-acting cylinder, in which case retraction cylinders 21 can be omitted. However, the use of the retraction cylinders 21 can also be advantageous when double-acting cylinders are used.

In the embodiment shown in FIG. 9, the unillustrated membrane 11 is clamped to the pressure case 6. The throughgoing beam 5 is heatable, as is the press table 3. Furthermore, the pressure case 6 and also the base plate 3 are heatable, with the base plate 3 constituting the die and thus the mold 4 in the illustrated embodiment. In principle, however, it also lies within the scope of the invention for the mold or the die to be on such a base plate.

The figures have been described with reference to the preferred use of organic sheets and/or organic sheet layers. However, other thermoplastic, semifinished (fiber composite) products and, in particular, semifinished products composed of a plurality of individual layers placed loosely (in non-consolidated form) into the press can also be processed in the manner shown.

The invention claimed is:

1. A press for making a part from fiber composite, the press comprising:
   a laterally open C-shaped frame consisting of a plurality of C-frames provided one behind the other and each C-shaped, the frame having a horizontal upper C-leg, a horizontal lower C-leg, and a vertical C-base extending between the upper and lower C-legs,
   a mold,
   a lower element on the lower C-leg and supporting the mold,
   a upper element on the upper C-leg and having a pressure case that can be sealed against the lower element,
   cylinders supported on the frame and acting on the upper element or on the lower element,
   a membrane stretchable over or against the mold, and
   a vacuum pump that can create a subatmospheric pressure on one side of the membrane.

2. The press defined in claim 1, further comprising: claiming elements securing together the plurality of C-frames.

3. The press defined in claim 1, wherein the cylinders are supported on the upper C-leg and act upon the upper element, and the lower element is fixed on the lower C-leg.

4. The press defined in claim 1, wherein the lower element or the upper element is heatable.

5. The press defined in claim 1, wherein the mold or a base plate supporting or forming the mold is heatable.

6. The press defined in claim 1, wherein the pressure case is heatable.

7. The press defined in claim 1, wherein the membrane is made of silicone.

8. The press defined in claim 1 wherein the membrane is secured to the upper element in an elastically biased manner so as to be clamped into the pressure case.

9. A press for making a part from fiber composite, the press comprising:
   a laterally open C-shaped frame having a n horizontal upper C-leg, a horizontal lower C-leg, and a vertical C-base extending between the upper and lower C-legs;
   a mold;
   a lower element on the lower C-leg and supporting the mold;
   a upper element on the upper C-leg and having a pressure case that can be sealed against the lower element;
   press cylinders supported on the frame and acting on the upper element or on the lower element;
   a membrane stretchable over or against the mold;
   a vacuum pump applying subatmospheric pressure on a side of the membrane turned toward the mold;
   a superatmospheric pressure pump applying superatmospheric pressure in the pressure case on an opposite side of the membrane turned away from the mold; and
   means for heating an interior of the pressure case on the opposite side of the membrane or for heating the mold.

* * * * *